UNITED STATES PATENT OFFICE.

WILLIAM W. CARTER, OF NEEDHAM, MASSACHUSETTS.

RUBBER SUBSTITUTE AND PROCESS OF MAKING THE SAME.

1,251,863.     Specification of Letters Patent.     Patented Jan. 1, 1918.

No Drawing.     Application filed March 30, 1917. Serial No. 158,750.

*To all whom it may concern:*

Be it known that I, WILLIAM W. CARTER, a citizen of the United States, residing at Needham, in the county of Norfolk and State of Massachusetts, have invented certain new and useful Improvements in a new and useful Rubber Substitutes and Process of Making the Same, of which the following is a specification.

In a copending application filed March 29, 1917, Serial No. 158,403, I have described and claimed a process of producing a composition having qualities similar to those of soft india rubber and adapted to be used for many purposes as a substitute therefor, the basis of the composition being the product resulting from the reaction of a sulfonate on an oil which can be polymerized. My present invention is a development of that above referred to, and results in the production of the composition in a converted form in which it is adapted to be molded and transformed by heat into a substance having qualities similar to those of vulcanized rubber, or to be dissolved in a solvent to form a varnish.

The soft composition above referred to is preferably produced in a commercial way by mixing with constant stirring about two and one half parts by weight of China wood oil and about two parts of a thick liquid consisting substantially of sulfonates derived from the so-called acids of wood tar or coal tar, or both. After the mixture has been allowed to stand about half an hour the reaction is completed and a composition results which will set and take the form of the receptacle containing it and may be stabilized by a neutralizing treatment as described in my prior application. According to my present invention the process is modified by adding to the China wood oil, before mixing the latter with the sulfonates, a substance which for want of a better term I will call a convertible diluent, whereby the product resulting from the reaction is caused to remain fluid or viscous instead of setting and taking the form of the receptacle. By "vulcanizable diluent" I mean a substance which is soluble in or a solvent of the oil, will not interfere with the formation of the soft composition above referred to, will have the effect of a solvent for the composition, and will be capable of solidification in connection with the soft composition by the converting treatment hereinafter described. There are various substances which have the characteristics just described and may be utilized in my process, examples of these being tar acids, sulfonates derived from these acids or from other sources, and other fluid benzol derivatives of which the molecules contain a free hydroxyl group or a free sulfonate group. In practice I prefer to use tar acids as the diluent. The quantity of the tar acids to be added to the oil may be from two to four times the amount of oil by weight, depending upon the intended use of the ultimate product, the hardness and brittleness of which, if completely converted, will increase with the proportion of the tar acids relative to the oil.

The fluidity of the composition prepared as above described will increase with the relative proportion of tar acids employed. Within the limits of the proportions stated its consistency will range, roughly speaking, between that of dough and that of molasses, being such in any case that the composition can be stabilized by washing it. Before this is done, however, it is subjected to a converting treatment, analogous to the vulcanization of crude rubber, by the addition of formaldehyde or some substance (such as hexamethylenetetramin, for example,) which will yield formaldehyde to the mixture. For complete conversion I add formaldehyde in about the proportion of one half to three quarters part by weight of 40% formaldehyde solution to one part of the composition, these proportions corresponding to the above-mentioned proportions of tar acids added to the oil. If the proportion of formaldehyde is diminished the conversion will not be complete and the ultimate product will be less hard and more flexible. The formaldehyde is slowly added to the composition in a thin stream which is thoroughly stirred in until the mixture forms an emulsion, and after this has been done the mixture is allowed to stand for a few hours, (over night, for example,) during which time the emulsion breaks and the converted composition settles to the bottom of the receptacle, leaving a watery liquid at the top. This liquid is then drained off and the residue is stabilized by thoroughly washing it and thereby removing any uncombined acids and sulfonates.

The manner in which the residue should be washed will depend upon its consistency, which is not materially changed by the action of the formaldehyde from that of the previously-prepared composition. If very thick the residue can be washed in a powerful rubber washing machine; otherwise it is preferably washed in an automatic stirring drum. An excess of water is employed in the washing process, which is continued until there is no trace of acid in the water, and the washed composition is then dried. Drying is preferably accomplished by tumbling the composition in a drum at less than atmospheric pressure and at a temperature below 80 C., and leaves the composition in a dry granular form. The removal of the acid may be hastened if desired by adding alkali to the wash water.

The dried composition thus produced can be molded to any desired shape and solidified either by putting the cold composition into hot molds or by heating the composition and immediately molding in cold molds. At a temperature of about 120 C. it will set in ten minutes or less. The qualities of the resulting product are similar to those of vulcanized rubber. It is insoluble in water and in most solvents, and is an excellent nonconductor of electricity. In its hard form it is better than hard rubber in respect to retaining its luster if polished, and is also mechanically stronger and less brittle, being capable of use for practically any purpose for which hard rubber is adapted.

Before drying and molding the washed composition above described it may be mixed with a filler and then dried and molded, and practically anything can be used as a filler which can be used for the same purpose in the manufacture of vulcanized rubber articles, except that the filler employed should not contain strong alkali. The composition can also be used in any proportion as a filler for india rubber.

Instead of molding the dry granular composition it may be used to make a varnish by dissolving it in a solvent, but when thus used I prefer to add not more than two parts of free tar acids to one of oil when these ingredients are mixed prior to the addition of the sulfonates, the object and result of diminishing the proportion of tar acids being to increase the flexibility of the varnish. In making the varnish no filler is used and after the converted composition has been washed it is dried until it becomes nearly solid and is then dissolved in the solvent, which may be any of the benzols, acetone, alcohol and the like, or mixtures of these. The liquid varnish thus produced is water proof when dry and can be applied to a wet surface. If the proportion of free tar acids added to the oil does not exceed that above specified the varnish dries quickly and is flexible. It becomes more brittle if heated, although less brittle than a shellac varnish, and is more resistant to chemical action after being heated than before.

While I have specified China wood oil and the sulfonates obtained from the tar acids as the ingredients which I prefer to employ in making the composition above described, it is to be understood that my invention is not limited to the use of these ingredients, since other polymerizable oils and other sulfonates may be used instead, as explained in my prior application above referred to.

I claim:—

1. A process of producing a composition adapted for use as a rubber substitute, which includes the thorough mixing of a sulfonate, a polymerizable oil and a convertible diluent, allowing the mixture to stand until the reaction product of the oil and sulfonate has been formed, subjecting the product to the action of formaldehyde or its equivalent, and washing and drying the resulting composition, substantially as described.

2. A process of producing a composition adapted for use as a rubber substitute, which includes the thorough mixing of a sulfonate, a polymerizable oil and a convertible diluent, allowing the mixture to stand until the reaction product of the oil and sulfonate has been formed, subjecting the product to the action of formaldehyde or its equivalent, washing the resulting composition, and simultaneously drying it and reducing it to a granular form in a partial vacuum and at a temperature below 80 C., substantially as described.

3. A process of producing a composition adapted for use as a rubber substitute, which includes the thorough mixing of a sulfonate, China wood oil and a convertible diluent, allowing the mixture to stand until the reaction product of the oil and sulfonate has been formed, subjecting the product to the action of formaldehyde or its equivalent, and washing and drying the resulting composition, substantially as described.

4. A process of producing a composition adapted for use as a rubber substitute, which includes the thorough mixing of sulfonates derived from tar acids with China wool oil and free tar acids, allowing the mixture to stand until the reaction product of the oil and sulfonates has been formed, subjecting the product to the action of formaldehyde or its equivalent, and washing and drying the resulting composition, substantially as described.

5. A composition adapted for use as a rubber substitute, containing the solidified re-action product of a polymerizable oil and a sulfonate.

6. A composition adapted for use as a rubber substitute, containing the solidified re-action product of China wood oil and a sulfonate.

7. A composition adapted for use as a rubber substitute, containing the solidified re-action product of China wood oil and sulfonates derived from tar acids.

8. A composition adapted for use as a rubber substitute, containing the product resulting from the action of formaldehyde on the reaction product of a polymerizable oil and a sulfonate mixed with a convertible diluent.

9. A composition adapted for use as a rubber substitute, containing the product resulting from the action of formaldehyde on the reaction product of China wood oil and a sulfonate mixed with a convertible diluent.

10. A composition adapted for use as a rubber substitute, containing the product resulting from the action of formaldehyde on the reaction product of China wood oil and sulfonates derived from tar acids, mixed with a convertible diluent.

11. A composition adapted for use as a rubber substitute, containing the washed and dried product resulting from the action of formaldehyde on the re-action product of a mixture of sulfonates derived from tar acids with China wood oil to which free tar acids have been added.

Signed at Boston, Mass., this 21st day of March, 1917.

WILLIAM W. CARTER.

Copies of this patent may be obtained for five cents each, by addressing the "Commissioner of Patents, Washington, D. C."

It is hereby certified that in Letters Patent No. 1,251,863, granted January 1, 1918, upon the application of William W. Carter, of Needham, Massachusetts, for an improvement in "Rubber Substitute and Processes of Making the Same," an error appears in the printed specification requiring correction as follows: Page 1, line 49, for the word "vulcanizable" read *convertible;* and that the said Letters Patent should be read with this correction therein that the same may conform to the record of the case in the Patent Office.

Signed and sealed this 26th day of February, A. D., 1918.

[SEAL.]                                                  F. W. H. CLAY,

*Acting Commissioner of Patents.*

Cl. 106—23.